(12) United States Patent
D'Angelo et al.

(10) Patent No.: US 7,290,181 B2
(45) Date of Patent: Oct. 30, 2007

(54) APPARATUS AND METHOD FOR CONTEXT-SENSITIVE ERROR EVENT NOTIFICATION

(75) Inventors: Dario D'Angelo, Los Gatos, CA (US); Alan Ray Smith, Gilroy, CA (US); Kevin Richard Stewart, International Falls, MN (US); Thomas Richard Sullivan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/751,355

(22) Filed: Jan. 5, 2004

(65) Prior Publication Data

US 2005/0188273 A1 Aug. 25, 2005

(51) Int. Cl.
*G06F 11/00* (2006.01)
(52) U.S. Cl. ........................................................ 714/48
(58) Field of Classification Search .................. 714/48
See application file for complete search history.

(56) References Cited

U.S. PATENT DOCUMENTS

| | | | | |
|---|---|---|---|---|
| 6,205,563 | B1* | 3/2001 | Lewis | 714/47 |
| 6,219,648 | B1* | 4/2001 | Jones et al. | 705/8 |
| 6,526,524 | B1* | 2/2003 | Kelley | 714/38 |
| 6,567,937 | B1* | 5/2003 | Flores et al. | 714/46 |
| 6,615,376 | B1* | 9/2003 | Olin et al. | 714/57 |
| 6,617,969 | B2 | 9/2003 | Mi et al. | 340/517 |
| 2003/0051191 | A1* | 3/2003 | Circenis et al. | 714/25 |
| 2003/0056151 | A1* | 3/2003 | Makiyama | 714/38 |
| 2003/0101385 | A1* | 5/2003 | Lee | 714/48 |
| 2005/0097405 | A1* | 5/2005 | Sesek et al. | 714/48 |

FOREIGN PATENT DOCUMENTS

| | | | |
|---|---|---|---|
| JP | 2001052021 | A | 2/2001 |
| JP | 2003005827 | A | 1/2003 |
| JP | 2003067531 | A | 3/2003 |

* cited by examiner

*Primary Examiner*—Michael Maskulinski
(74) *Attorney, Agent, or Firm*—Kunzler & McKenzie (57) ABSTRACT

An apparatus and method are provided for context-sensitive error event notification. The apparatus and method include a monitor to detect an error event within a computer application, an analysis module to determine characteristics of the error event, an assembler to compose a context-sensitive message comprising a context-sensitive resource relating to the event characteristics, and a transmission module to transmit the message to a set of addressees. The context-sensitive message may include error characteristics, error-specific information from reference materials, error-specific links to related information repositories, and an error-associated search. The context-sensitive message is automatically transmitted to a set of addressees that are associated with the error event. The invention provides for faster error recovery and more effective problem resolution by automatically transmitting an error notification message that is timely, informative, and includes resources associated with the error event such that people can solve the problem.

24 Claims, 6 Drawing Sheets

(Prior Art)

APPARATUS AND METHOD FOR CONTEXT-SENSITIVE ERROR EVENT NOTIFICATION

BACKGROUND OF THE INVENTION

1. Field of the Invention

This invention relates to error event notification and more particularly relates to computer error event notification wherein the message contents and addressees are based at least partly on characteristics of the error event.

2. Description of the Related Art

Modern business enterprises rely heavily on a wide variety of information technology, including both software and hardware, to implement business strategies, to allocate resources, to track the execution of business processes, and to provide an interface for communication with customers, vendors and their own personnel. Business processes executed by a business enterprise may be executed across enterprise system boundaries as well as within enterprise system boundaries.

Even during standard, non-peak operating conditions, the quantity of data that is processed by an enterprise system can be enormous. This data may be received by a business enterprise or produced by a business enterprise for internal use as well as for transmission outside the business enterprise system. With the vast amount of data processed in enterprise systems, detection of problems and delivering problem notification to appropriate parties is a complicated task. As a result, existing and potential problems that could arise during the execution of business processes could go undetected and uncorrected for long periods of time. It would therefore be desirable if a mechanism for detecting error conditions and delivering concise, highly informative messages to individuals with the ability to solve the problem could be established.

Figure 1:
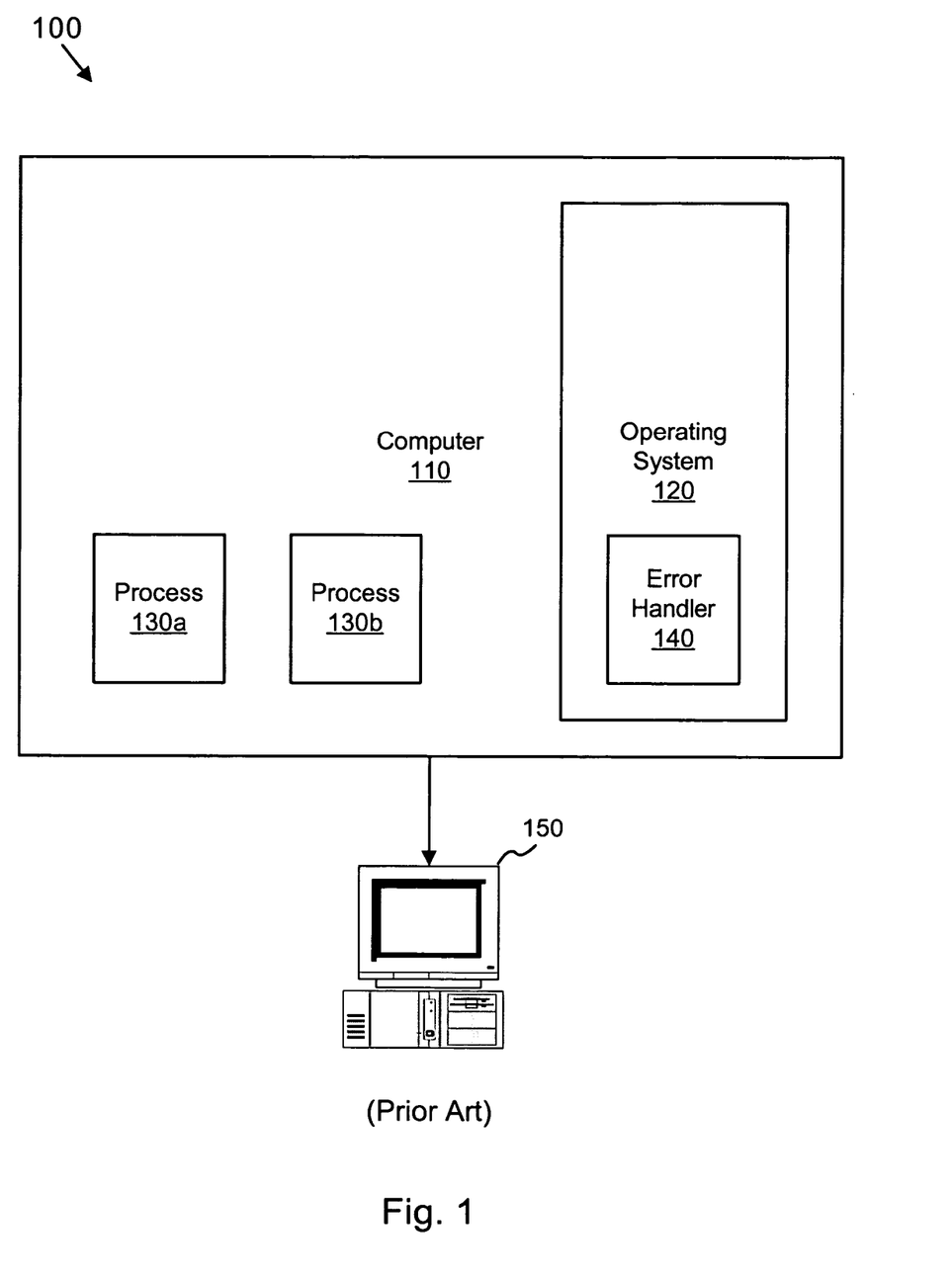
FIG. 1 is a schematic block diagram illustrating a typical computer system.

FIG. 1 illustrates a conventional computer system 100 that includes a computer 110, an operating system 120 with an error handler 140, one or more processes 130, and an operator station 150. The computer system 100 is typically a stand-alone workstation, a subsystem of a larger computer system, or part of a computer network. A process 130 such as a database program or an accounting program is typically scheduled for execution and monitored by the operating system 120. The operating system 120 often schedules concurrent process execution to facilitate efficient use of system resources.

Although application and system programmers attempt to produce problem-free programs, errors sometimes occur during system operation. Errors in application programs are often handled within the application program, but occasionally an error may be reported to the operating system 120. Errors in system programs may also be reported to the operating system. The operating system 120 generally protects the integrity of concurrent processes 130 by monitoring errors during process execution. A typical operating system 120 incorporates an error handler 140 that is called at the time an error is detected. The error handler 140 may retry a failing operation or may end a failing process.

If the error handler 140 receives an error, it may be desirable for a user, operator, or system administrator to take action to resolve the error. Some computer systems have incorporated automated processes that capture the occurrence of an error event and send a message to the operator station 150. The user or operator may then be responsible to relay the error information to technical support personnel, often resulting in late and incomplete transmission of information to those who can correct the problem.

After technical support personnel are notified, there is usually a need to consult computer documentation to understand a cause of the error. Additionally, a search of available technical support databases is generally conducted to understand if similar problems have been previously reported. This operation can be quite time consuming and typically relies on the ability and knowledge of a technical support person in order to find an appropriate database and properly enter a valid search argument.

What a need exists for a method, apparatus, and system that provide automatic context-sensitive error event notification to appropriate parties by sending a context-sensitive message containing error event-specific information that meets the needs of a recipient. In such a method, apparatus, and system, the message contents and recipients should vary according to the system context, and/or according to the one or more characteristics of the error event. Beneficially, such a method, apparatus, and system would provide accurate, timely notification to appropriate personnel that includes information and/or links to information necessary to quickly recover from an error and also to promptly correct the underlying cause of the error.

SUMMARY OF THE INVENTION

The present invention has been developed in response to the present state of the art, and in particular, in response to the problems and needs in the art that have not yet been fully solved by currently available error event notifiers. Accordingly, the present invention has been developed to provide a method and apparatus for context-sensitive error event notification that overcome many or all of the above-discussed shortcomings in the art.

The apparatus for context-sensitive error event notification comprises a logic unit containing a plurality of modules configured to functionally execute the necessary steps of error event notification. These modules may include a monitor, an analysis module, an assembler, and a transmission module.

The apparatus, in one embodiment, is configured to detect an error in a computer application, determine the error characteristics, compose a context-sensitive message comprising at least one context-sensitive resource relating to the event characteristics, and transmit the message to a set of addressees. The present invention automatically transmits a message based at least in part upon an error event. The message may contain error characteristics, error-specific information, and/or error-specific links to information that may be useful in troubleshooting and problem resolution. The message may be sent to a configurable list of addressees associated with correcting the error, using a configurable set of communications methods. The context-sensitive message is composed such that the contents and recipients may vary according to at least one of the characteristics of an error event.

In one embodiment, the context-sensitive message is generated from an error-specific template that may specify insertion of addresses, error-specific information, error-specific links, and error associated search arguments. Use of such a context-sensitive selection of addressees, information, and links permits message configurations that may meet the needs of a broad range of appropriate parties.

The apparatus is further configured, in one embodiment, to transmit a message containing links with associated error-specific search arguments. Activation of the links may cause a search of a website or database to identify multiple entries related to the error characteristics. This capability is particularly helpful when linking to reference repositories such as reference manuals describing the error, solutions to previously identified problems, user identified errors in related areas, and the like. Furthermore, since websites and databases may be updated frequently, linking to these reference repositories may be desirable to provide the most accurate and up-to-date error information.

A method of the present invention is also presented for context-sensitive error event notification. The method in the disclosed embodiments substantially includes the steps necessary to carry out the functions presented above with respect to the operation of the described apparatus. In one embodiment, the method includes detecting an error event within a computer application, determining characteristics of the error event, composing a context-sensitive resource relating to the event characteristics, and transmitting the message to a set of addressees. The method also may include generating a context-sensitive message from a user configurable template, wherein the template may specify insertion of error characteristics, error-specific information, error-specific links, and error associated search arguments.

In a further embodiment, the method includes transmitting a context-sensitive message using communication methods such as email, instant messaging, voice-over-IP, paging, audio messaging, and short message service. A default communication method may apply to all messages, or a communication method may be configured for each addressee. The ability to configure messages for delivery by various methods permits a message's delivery attributes to match the needs of the recipient. For instance, some recipients may desire immediate notification with little detail, while others may need less immediacy and more detail.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Present computer systems lack the capability to quickly respond to errors by automatically providing error-specific information or links to information that enable quick and effective solutions to a problem. For example, a computer system may respond to an error by displaying a screen filled with characters and numbers that are completely bewildering to a user or operator. Furthermore, a user or operator may interact with a remotely located member of a technical staff who cannot see the display output, and therefore may have more difficulty in troubleshooting the error. A message that is both timely and informative, sent to an appropriate person will result in faster error recovery and more effective problem resolution.

The present invention is a context-sensitive error event notifier that automatically transmits a message based at least in part upon an error event. The message may contain error characteristics, error-specific information, and/or error-specific links to information that may be useful in troubleshooting and problem resolution. The message is sent to a configurable list of addressees associated with correcting the error, using a configurable choice of communications methods. The context-sensitive message is composed such that the contents and recipients vary according to the characteristics of an error event.

Figure 2:
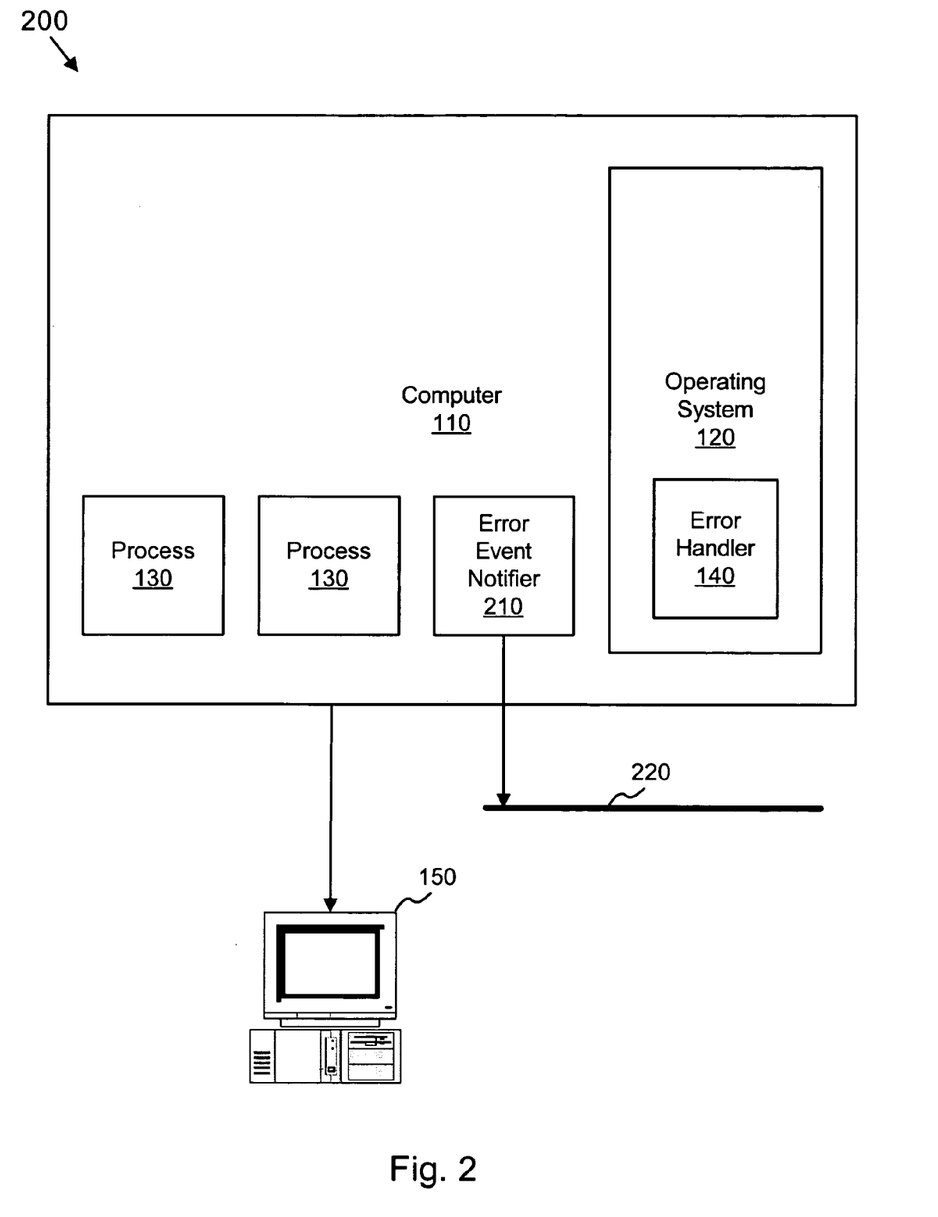
FIG. 2 is a schematic block diagram illustrating a system for implementing a context-sensitive error event notifier in accordance with one embodiment of the present invention.

FIG. 2 illustrates a system 200 for implementing a context-sensitive error event notifier 210 in accordance with one embodiment of the present invention. The system 200 includes a computer 110, a communication network 220, and an operator station 150. The computer 110 includes one or more processes 130, an operating system 120 with an error handler 140, and an error event notifier 210. The computer system 200 may be a stand-alone system, part of a computer network, or a subsystem in a larger computer system.

The computer 110 executes one or more processes 130. The operating system 120 performs multiple functions, among which are memory allocation, user interface, hardware interface, process scheduling, and the like. The operating system 120 may detect errors in both application and system programs. The error handler 140 manages the system response to an error.

A process 130 may encounter an error that is passed to the error handler 140. The error handler 140 may call the event notifier 210 upon receipt of an error. Alternately, the event notifier 210 may detect an error experienced by a process 130 directly. The event notifier 210 may determine one or more characteristics of the error and processor state at the time of the error. The event notifier 210 may retrieve an error-specific message template, insert error-specific characteristics, insert error-specific information and/or error-specific information links into the message template and send the message to an error-specific set of addressees.

The error characteristics may include error codes, error descriptions, contents of certain registers, identity of failing code modules, identity of a failing system, error types, timestamps, and so forth. The information may include sections from computer manuals and other computer documentation. The information links may include pointers to sections of documentation or pointers into databases containing problem logs and so forth. The information links may include universal resource locators (URLs) pointing to support websites that contain databases of solutions to known problems, frequently asked questions, and the like. The information links may also include search arguments that direct a search of a database to identify further information entries. The message may be transmitted by the communications network 220 to a set of addressees associated with the error and may also be displayed to the operator station 150. The message structure, content, and communication method may be configured to meet the needs of an addressee.

Inclusion of the event notifier 210 into the computer system 200 may enable timely resolution of problems by providing automatic transmission of error event messages to a customizable set of people, each message configured to provide an optimum set of information. In addition, technical staff may not become overloaded with messages that are not associated with their functional responsibilities.

Figure 3:
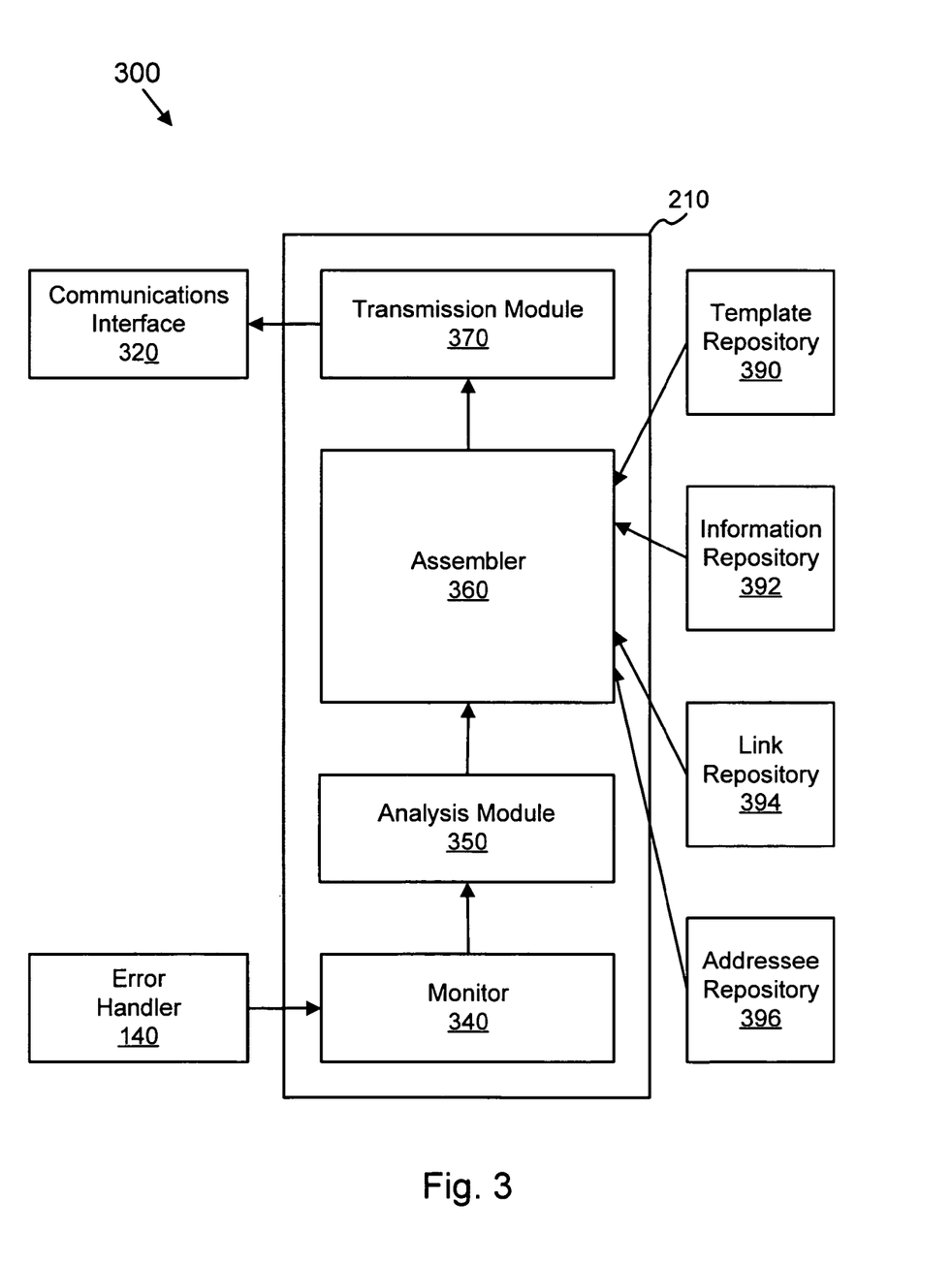
FIG. 3 is a schematic block diagram illustrating one embodiment of a context-sensitive error event notification apparatus in accordance with the present invention.

FIG. 3 is a schematic block diagram illustrating one embodiment of an apparatus 300 for context-sensitive error event notification. The apparatus 300 may include an error event notifier 210 and a plurality of repositories. The error event notifier 210 may include a monitor 340, an analysis module 350, an assembler 360, and a transmission module 370. The error event notifier 210 communicates with a communications interface 320 and an error handler 130. Alternatively, the error event notifier 210 communicates directly with one or more processes 130. The communications interface 320 may provide an interface between an application program and implementations of communication hardware that transmit messages in accordance with various communication methods and communication protocols.

During execution of a computer application, a software module may encounter an error condition. The application error condition may be caused by unexpected inputs, improper calculations, unavailable function calls, or the like. If the computer application cannot recover from the error condition, the computer application may signal an error event. In a like manner, during operation of a system program, the operating system may encounter an error condition. The system error condition may be caused by timeouts, hardware problems, insufficient memory, or similar conditions. The error handler 130 may attempt error recovery or may terminate the computer application or system process. If the error handler 130 cannot recover from the error satisfactorily, the monitor 340 may be notified. Alternatively, the monitor 340 may detect the error event by monitoring the software application directly.

The analysis module 350 cooperates with the monitor 340 to determine characteristics of the error event. For example, the analysis module 350 may record an error code, read contents of certain processor registers, determine an error subtype, and identify a module that exhibited the error. Additionally, the analysis module 350 may identify a system or subsystem with the error, identify concurrently executing processes, record a date and time, and so forth. The analysis module 350 may determine a different set of error event characteristics depending upon the specific error event and the system environment at the time the error occurred.

The assembler 360 receives the error event characteristics from the analysis module 350 and composes a context-sensitive message including at least one context-sensitive resource relating to the event characteristics. In one example, the assembler 360 may compose a context-sensitive message that contains an error code and lists the error event characteristics. In a second example, the assembler 360 may compose a context-sensitive message by retrieving a predefined message associated with the error event and appending error event characteristics.

In a third example, the assembler 360 may compose a context-sensitive message by retrieving a message template associated with an error event and inserting context-sensitive information into the message template based upon error event characteristics. In addition, one or more context-sensitive links to information may be inserted into the message template based upon error event characteristics. Alternatively or in addition, the context-sensitive links may include one or more URLs with search arguments that cause an automatic search of a support database.

In one embodiment, the assembler 360 may compose a context-sensitive message by using error event characteristics to identify a specific message template from among the message templates stored in a template repository 390 wherein a message template may be associated with an error characteristic such as an error code. The message template may contain predefined text interspersed with identifiers that instruct the assembler 330 to insert certain types of information into the message. An identifier may identify one of multiple types of information that may be inserted into a message.

For example, a first type of identifier may specify insertion of an error description and error characteristics. A second type of identifier may specify insertion of a section of text from a document or file into a message. A third type of identifier may specify insertion of a link to a document or file into a message. A fourth type of identifier may specify insertion of a universal resource locator (URL) of a web site that contains relevant information into a message. A fifth type of identifier may specify insertion of key error information such as an error code into a search argument association with link such as a URL, into a message. A sixth type of identifier may specify insertion of one or more addressees for delivery of a message.

The assembler 360 examines a message template for identifiers and inserts identifier-specified data into a message. The assembler 360 may insert an error description and characteristics determined by the analysis module 350 into the message in accordance with a characteristics identifier.

The assembler 360 may insert addressees and corresponding addresses associated with an error characteristic into the message in accordance with an address identifier from an address repository 396, wherein an addressee may be associated with an address and an error characteristic, such as an error code.

The assembler 360 may insert information associated with an information type and an error characteristic into the message in accordance with one or more information identifiers from an information repository 392, wherein an item of information may be associated with an information type and an error characteristic such as an error code.

The assembler 360 may insert a link associated with a link type and an error characteristic into the message in accordance with one or more link identifiers from a link repository 394, wherein a link may be associated with a link type and an error characteristic, such as an error code.

The assembler 360 may insert one or more error characteristics, such as an error code, into a predefined search argument in accordance with one or more argument identifiers. Use of context-sensitive message templates, context sensitive addressees, and context-sensitive characteristics, context-sensitive text and link identifiers permits message configurations that may meet the needs of a broad range of appropriate parties.

The transmission module 370 receives a message from the assembler 360 and communicates with the communications interface 320 to send a message. The message composed by the assembler 370 includes one or more addresses. The transmission module 370 may construct a list of messages to be sent, each message with one address. The transmission module 370 may then format each message for a communication method predefined by the event notifier 210. The transmission module 370 then passes each formatted message with the associated address to the communications interface 320, which transmits the message.

Figure 4:
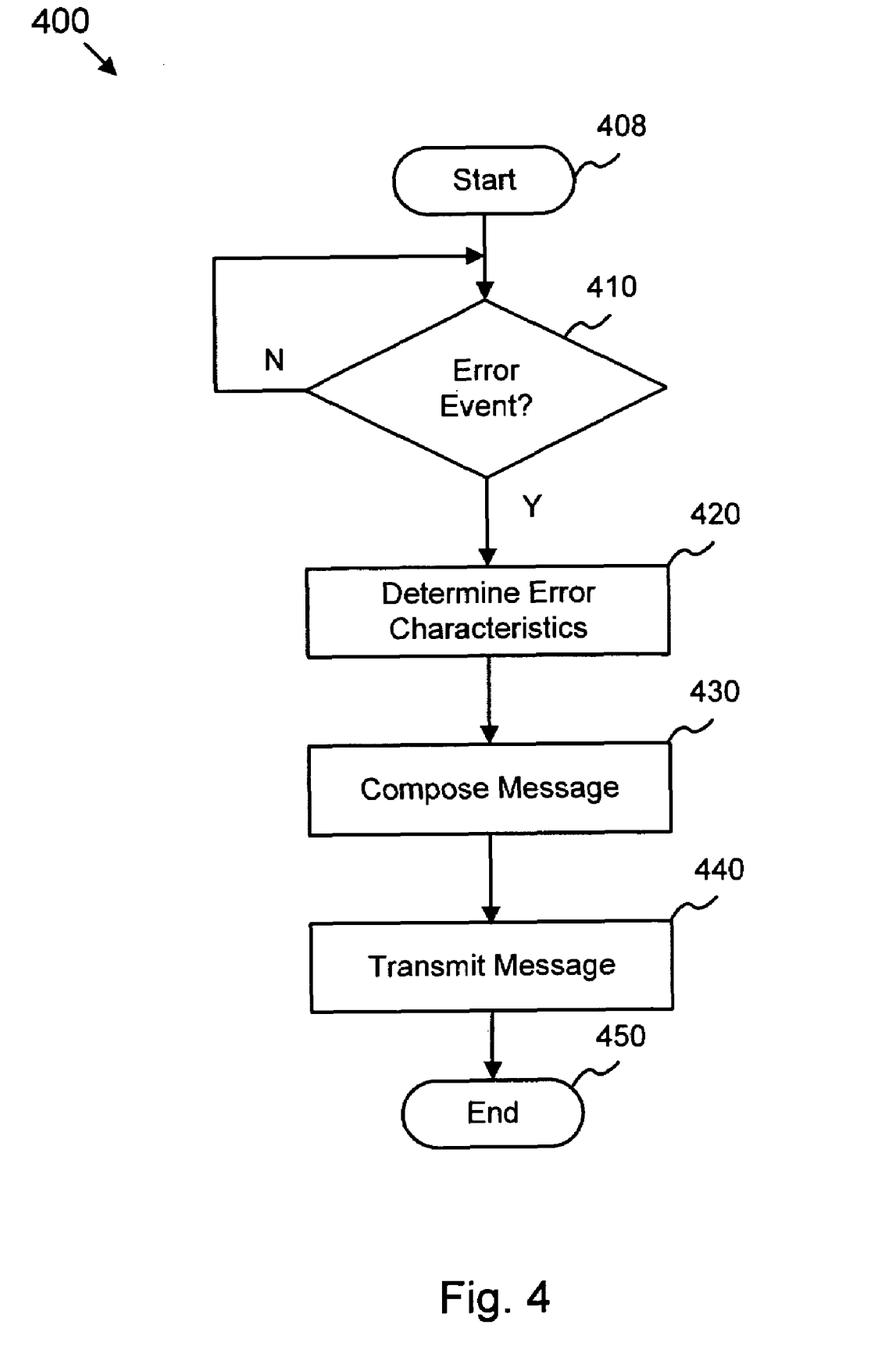
FIG. 4 is a schematic flow chart diagram illustrating one embodiment of a method for context-sensitive error event notification in accordance with the present invention.

FIG. 4 is a schematic flow chart diagram illustrating one embodiment of a method 400 for context-sensitive error event notification in accordance with the present invention. The method 400 starts 408 once the error notification capability is implemented.

First, a determination 410 is made whether an error has occurred. Errors may be detected by the operating system 160. Alternatively, the present invention may detect errors in processes 130 directly. Examples of errors detected by the operating system are an abnormal termination of a software application, an attempt to address memory not allocated to the application, insufficient memory to fulfill a memory request, and the like. If no errors are detected, monitoring continues. If an error event is detected, the method 400 determines 420 characteristics of the error. Examples of error characteristics may include error codes, error descriptions, contents of certain registers, identity of failing code modules, identity of a failing system, error types, timestamps, and so forth.

Then, the method 400 composes 430 a message in one embodiment by retrieving a message template associated with the error characteristics and incorporating information identified by the template. A message template may contain identifiers for addresses, text, error codes and characteristics, links and search arguments associated with the error characteristics. The identifiers may be embedded within a message template containing predefined text and one or more identifiers. A identifier may identify one of multiple types of information that may be inserted into the message. Thus, a context-sensitive message is created by retrieving an error-specific message template and inserting error-specific addressees, error-specific information, error specific information links, and error-specific search arguments associated with links.

In one example, an identifier may specify insertion of a link to a document that explains an error event. Alternatively or in addition, an identifier may specify insertion of a section of text from a user document into a message. An identifier may also specify insertion of a universal resource locator (URL) of a web site containing relevant information. Another identifier may specify insertion of search arguments associated with a link, such that a website search may be easily conducted. Predefined URLs may include an identifier that specifies insertion of key error information such as an error code. An identifier may also specify insertion of one or more addressees with associated addresses.

Next, the method 400 transmits 440 the message by utilizing a operating system communications interface 320. A communication method may be configured for each addressee. A message may include multiple addressees, hence multiple addresses. A list of messages, each associated with one address is constructed by examining a message composed 430 above. The method 400 formats a message to conform to the specified communication method and transmits 440 the message. Once the method 400 transmits all messages on the list, the method 400 ends 450.

Figure 5:
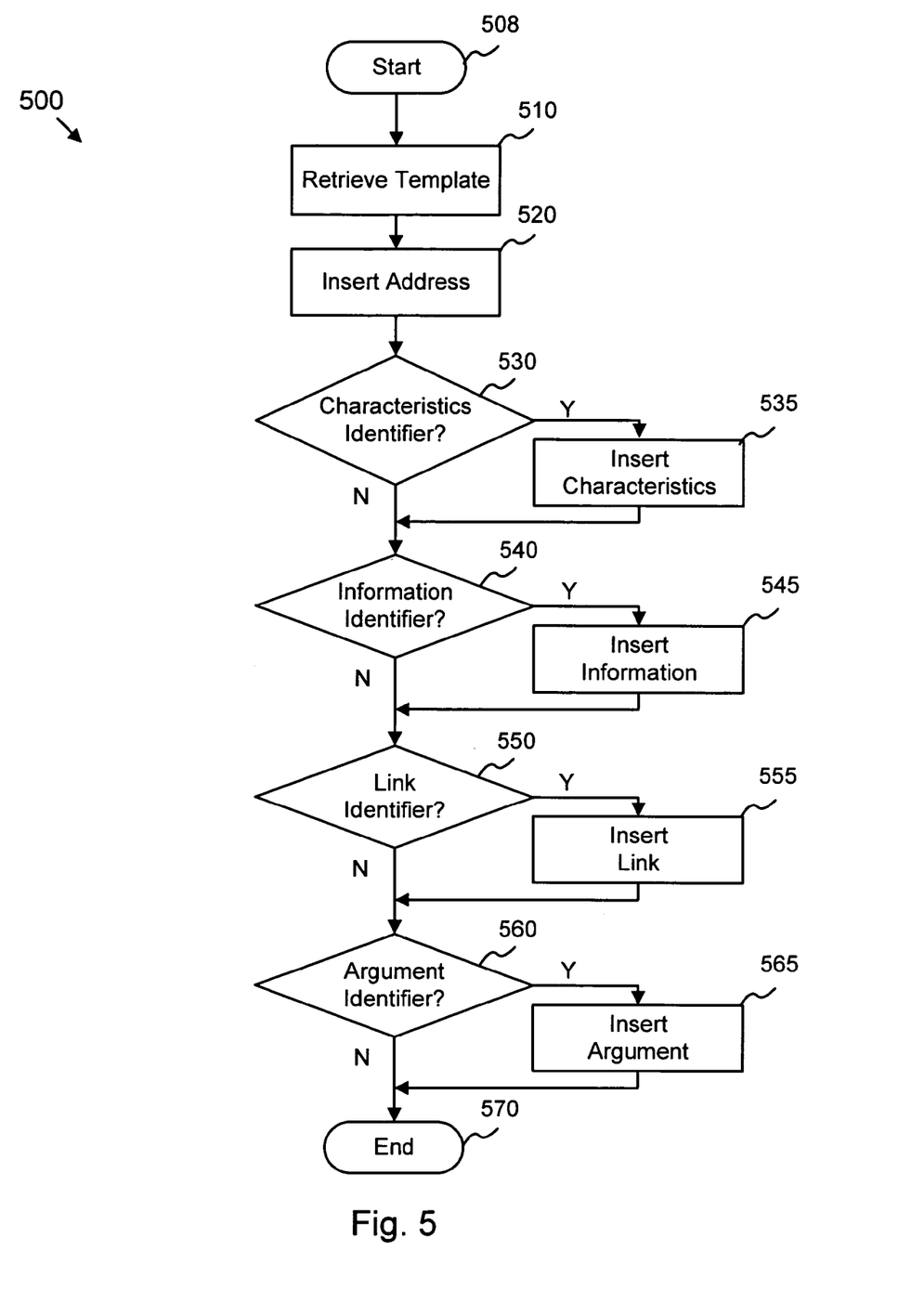
FIG. 5 is a schematic flow chart diagram illustrating one embodiment of a method for composing a context-sensitive message in accordance with the present invention.

FIG. 5 is a schematic flow chart diagram illustrating one embodiment of a method 500 for composing a context-sensitive message in accordance with the present invention. The method 500 comprises detailed aspects of composing a context-sensitive message as described in relation to FIG. 4. The method 500 starts 508 once characteristics of an error event have been determined 420.

The method 500 examines the error event characteristics and retrieves 510 a message template associated with the error event from a template repository such as the template repository 390 from FIG. 3. Then the method 500 inserts 520 one or more addresses and addressees associated with the error from an addressee repository similar to the addressee repository 396 (See FIG. 3). The message template may contain predefined text with information and links predefined, or may contain predefined text interspersed with identifiers that specify insertion of information or links. Those skilled in the art will recognize that a message template that may include predefined text interspersed with identifiers may be used to compose a message demonstrating many levels of detail and incorporating many varieties of context-sensitive information and links to information.

The method 500 may then examine 530 the message template for identifiers specifying insertion of error event characteristics. If a characteristics identifier is detected, the method 500 inserts 535 one or more previously determined error event characteristics into the message. For example, the error event characteristics may include an error code.

The method 500 then examines 540 the message template for identifiers specifying insertion of information. If an information identifier is detected, the method 500 inserts 540 information specific to the error event into the message. There may be multiple information identifiers included in the message template, in which case the identifiers may be differentiated by information type. For example, a message template may specify insertion of an extract from a system manual as well as the insertion of a section from a repository of frequently asked questions (FAQ). Error-specific information from an information repository similar to the information repository 392 from FIG. 3 may be inserted 545 into the message. The information may be text containing excerpts from information resources such as user documentation, frequently asked questions (FAQ), Hints and Tips, known defects, service recommendations, solutions to previously identified problems, user identified errors, and the like.

The method 500 examines 550 the message template for identifiers specifying insertion of links. A link (such as a hyper-link) may be a pointer into a repository of information or a universal reference locator (URL), which is a pointer to a website. There may be multiple link identifiers included in the message template, in car which case the identifiers may be differentiated by link type. For example, a message template may specify insertion of a link to a section of a system manual as well as the insertion of a link to a URL of a website containing a repository of frequently asked questions (FAQ). A link may include an predefined search argument template containing an argument identifier. If a link identifier is detected, the method 500 inserts 555 error specific links from a link repository similar to the link repository 394 from FIG. 3 into the message.

The method 500 examines 560 a link search argument template for identifiers specifying insertion of arguments. If a search argument insertion is detected, the method 500 inserts 565 an error characteristic such as the error code to the search argument. A link with an associated search argument may reveal multiple information items in a document or a web page repository containing information. The method 500 ends 570 after addressees, error characteristics, information, links, and arguments are inserted in accordance with all identifiers included in the message template.

Figure 6:
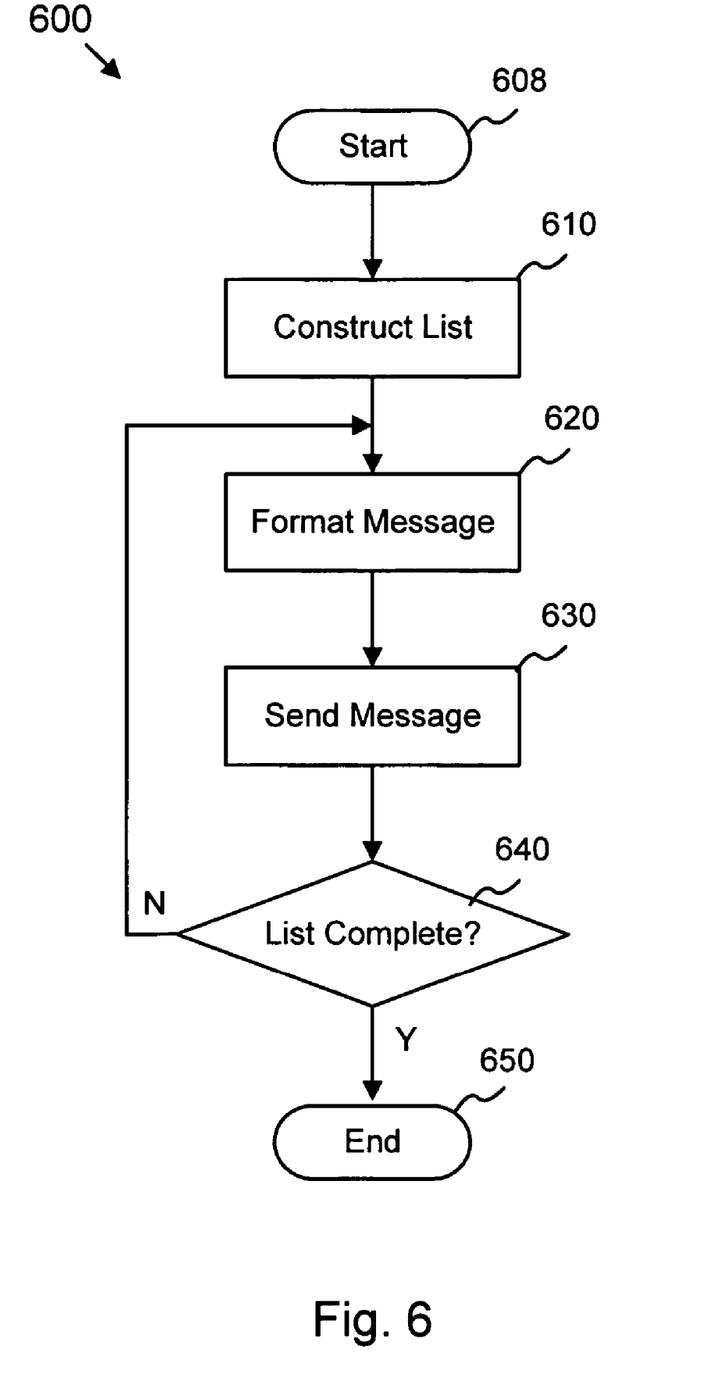
FIG. 6 is a schematic flow chart diagram illustrating one embodiment of a method for transmitting a context-sensitive message in accordance with the present invention.

FIG. 6 is a schematic flow chart diagram illustrating one embodiment of a method 600 for transmitting a context-sensitive message in accordance with the present invention. The method 600 is an expanded description of transmitting an error event message as described in relation to FIG. 3. The method 600 starts 608 once a context-sensitive error notification message has been composed 330.

The method 600 receives a context-sensitive message composed by an assembler such as the assembler 360 of FIG. 3. The messages may include text, addresses, and links to information repositories or web sites. The method 600 examines the addresses contained in the message, and constructs 610 a list of messages to be sent by making a list entry for each address.

One of a number of communication methods may be used to send 630 a context-sensitive message, each communication method exhibiting differing attributes. Some communication methods may serve to convey immediate notification with limited message content while other communication methods may convey detailed message content with less immediacy. In one embodiment, the method 600 may use the communication methods e-mail, instant messaging, voice-over-IP, paging, audio messaging, and short message service (SMS) to send 630 a message.

A default communication method that applies to all messages may be configured, or a communication method may be configured for each addressee. The method 600 formats 620 a first message of the list of messages in accordance with the communication method protocol and uses an operating system communications interface 320 (See FIG. 3) to send 630 the message to the addressee. The method 600 then determines 640 if all messages in the list have been sent. If all messages have been sent, the method 600 ends 650. If not, the method 600 formats 620 the next message in the list.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for context-sensitive error event notification, the apparatus comprising:

a monitor configured to detect an error event within a computer application;

an analysis module configured to determine characteristics for the error event;

an assembler configured to compose a context-sensitive message comprising at least one context-sensitive resource relating to the determined error event characteristics, wherein the at least one context-sensitive resource comprises a pointer to a reference repository associated with the error event, the reference repository selected from the group consisting of computer system documentation, exception codes, previously reported problems, solutions to previously identified problems, and frequently asked questions; and a transmission module configured to transmit the context-sensitive message to a set of addressees, wherein the context-sensitive message is transmitted using a communication method selected from the group consisting of e-mail, instant messaging, voice-over-IP, paging, audio messaging, and short message service (SMS).

2. The apparatus of claim 1, wherein the error event comprises an abnormal condition for the computer application.

3. The apparatus of claim 1, wherein the context-sensitive message is generated from a user configurable template.

4. The apparatus of claim 1, wherein the set of addressees comprises a configurable addressee repository that associates characteristics of the error event with one or more addressees.

5. The apparatus of claim 1, wherein the set of addressees is selected from the group consisting of system administrators, system programmers, application programmers, users, and Information Technology (IT) support personnel.

6. The apparatus of claim 1, wherein the at least one context-sensitive resource comprises an excerpt from a reference repository associated with the error event, the reference repository selected from the group consisting of computer system documentation, exception codes, previously reported problems, solutions to previously identified problems, and frequently asked questions.

7. The apparatus of claim 1 wherein the pointer is configurable.

8. The apparatus of claim 1, wherein the at least one context-sensitive resource is configured to automatically conduct a search based at least in part on at least one characteristic of the error event.

9. A computer readable storage medium comprising computer readable code configured to carry out a method for context sensitive error event notification, the method comprising:
   detecting an error event within a computer system;
   determining characteristics for the event;
   composing a context-sensitive message comprising at least one context-sensitive resource relating to the determined error event characteristics, wherein the at least one context-sensitive resource comprises a pointer to a reference repository associated with the error event, the reference repository selected from the group consisting of user documentation, solutions to previously identified problems, previously reported problems, and frequently asked questions; and
   transmitting the context-sensitive message to a context-sensitive list of addressees, wherein the context-sensitive message is transmitted using a communication method selected from the group consisting of e-mail, instant messaging, voice-over-IP, paging, audio messaging, and short message service (SMS).

10. The computer readable storage medium of claim 9, wherein the error event comprises an abnormal condition for the computer application.

11. The computer readable storage medium of claim 9, wherein the context-sensitive message is generated from a user configurable template.

12. The computer readable storage medium of claim 9, wherein the context-sensitive set of addressees comprises a configurable addressee repository that associates the error event with one or more addressees.

13. The computer readable storage medium of claim 9, wherein the context-sensitive set of addressees is selected from the group consisting of system administrators, system programmers, application programmers, users, software support personnel, and Information Technology (IT) support personnel.

14. The computer readable storage medium of claim 9, wherein the at least one context-sensitive resource comprises an excerpt from a reference repository associated with the error event, the reference repository selected from the group consisting of user documentation, solutions to previously identified problems, previously reported problems, and frequently asked questions.

15. The computer readable storage medium of claim 9, wherein the pointer is configurable.

16. The computer readable storage medium of claim 9, wherein the at least one context-sensitive resource is configured to automatically conduct a search based at least in part on at least one characteristic of the error event.

17. A method for context sensitive error event notification, the method comprising:
   detecting an error event within a computer application;
   determining characteristics of the error event;
   composing a context-sensitive message comprising at least one context-sensitive resource relating to the determined error event characteristics, wherein the at least one context-sensitive resource comprises a pointer to a reference repository associated with the error event, the reference repository selected from the group consisting of computer system documentation, solutions to previously identified problems, previously reported problems, and frequently asked questions; and
   transmitting the context-sensitive message to a set of addressees, wherein the context-sensitive message is transmitted using a communication method selected from the group consisting of e-mail, instant messaging, voice-over-IP, paging, audio messaging, and short message service (SMS).

18. The method of claim 17, wherein the error event comprises an abnormal condition for the computer application.

19. The method of claim 17, wherein the context-sensitive message is generated from a user configurable template.

20. The method of claim 17, wherein the set of addressees comprises a configurable addressee repository that associates characteristics of the error event with one or more addressees.

21. The method of claim 17, wherein the set of addressees is selected from the group consisting of system administrators, system programmers, application programmers, users, software support personnel, and Information Technology (IT) support personnel.

22. The method of claim 17, wherein the at least one context-sensitive resource comprises an excerpt from a reference repository associated with the error event, the reference repository selected from the group consisting of computer system documentation, solutions to previously identified problems, previously reported problems, and frequently asked questions.

23. The method of claim 17, wherein the pointer is configurable.

24. The method of claim 17, wherein the at least one context-sensitive resource is configured to automatically conduct a search based at least in part on at least one characteristic of the error event.

* * * * *